United States Patent [11] 3,607,172

[72] Inventors James P. Poole;
  Herbert C. Snyder; Mark A. Boschini, all of Brockway, Pa.
[21] Appl. No. 772,835
[22] Filed Nov. 1, 1968
[45] Patented Sept. 21, 1971
[73] Assignee Brockway Glass Company, Inc.
  Brockway, Pa.

[54] TRIPOTASSIUM PHOSPHATE TREATMENT FOR STRENGTHENING GLASS
6 Claims, No Drawings
[52] U.S. Cl. .................................................. 65/30,
  65/60, 65/114, 117/124
[51] Int. Cl. ........................................ C03c 21/00
[50] Field of Search ........................................... 65/30, 60,
  114; 117/124

[56] References Cited
UNITED STATES PATENTS
| | | | |
|---|---|---|---|
| 2,290,911 | 7/1942 | Jones | 65/30 X |
| 3,473,906 | 10/1969 | Graham | 65/30 |
| 3,486,995 | 12/1969 | Evers | 65/30 X |

Primary Examiner—S. Leon Bashore
Assistant Examiner—John H. Harman
Attorney—Christel & Bean ABSTRACT: Strengthening glass articles by spraying the same with a water solution of tripotassium phosphate ($K_3PO_4$) at a temperature slightly below the strain point of the glass, then holding the glass at such temperature for a time period sufficient to provide exchange of potassium ions for sodium ions of the glass surface, the potassium ions being of larger atomic diameter than the sodium ions whereby a surface compressive stress is created.

TRIPOTASSIUM PHOSPHATE TREATMENT FOR STRENGTHENING GLASS

BACKGROUND OF THE INVENTION

This invention relates to a method of increasing the mechanical strength of glass articles by chemical tempering.

Present methods of tempering glass articles to increase the breaking strength consist in providing a surface layer of glass which is in compression. Since glass always fails in tension and fractures generally originate at the surface of the glass, tempering the glass by establishing a compressive stress in the surface layer strengthens the glass in accordance with the degree of this compressive stress. This is due to the fact that a tensile stress will not be established at the surface layer until a sufficient strain is applied to first overcome the compressive stress.

The best known method of strengthening glass articles by establishing a surface compressive stress is by thermal tempering wherein the glass is cooled at a controlled rate, relatively rapidly, down through its strain point. In such cooling the surface layer passes below the strain point of the glass and thus solidifies before the interior thereof so that the subsequent cooling of the interior of the glass with its consequent shrinking establishes a compressive stress in the outer surface of the glass which is in equilibrium with a corresponding tensile stress in the interior of the glass.

Various other methods of establishing a compressive layer at the surface of a glass article have been proposed, one such method being shown and claimed in Weber U.S. Pat. No. 3,218,220 dated Nov. 16, 1965. According to this patent potassium ions are substituted for sodium ions at the surface layer of the glass and since the potassium ions are of larger atomic diameter the surface layer is thus placed under compression.

According to the Weber patent the exchange of potassium ions for sodium ions is accomplished by immersing the glass article in a molten potassium salt bath. This method is effective but is relatively expensive and time consuming and is consequently not readily applicable to glass articles of low cost and/or articles which must be produced rapidly on a mass-production basis.

SUMMARY OF THE INVENTION

The present invention provides a method whereby potassium ions may be exchanged for sodium ions in the surface layer of a glass article rapidly and as an incident in the mass production of such articles. Speaking generally, this is accomplished by spraying an aqueous tripotassium phosphate solution on the glass surface while the glass is at a temperature of about 950° F. and then "soaking" the glass by holding the same at approximately the same temperature for about one-half hour to permit the exchange of potassium ions for sodium ions to take place to a sufficient degree to establish a compressive stress by reason of the larger atomic diameter of the replacing potassium ions.

DESCRIPTION OF THE PREFERRED EMBODIMENTS

While several potassium compounds, and more particularly several potassium phosphate compounds, have proved useful in effecting the desired potassium-for-sodium ion exchange, we have found that unusual results are achieved by the use of tripotassium phosphate ($K_3PO_4$).

Application of the $K_3PO_4$ is by spraying an aqueous solution (preferably about 50 percent) of the $K_3PO_4$ on glass articles while they are in a heated condition so that the water flashes off, leaving the potassium salt deposited on the hot glass surface.

In the following examples the glass was held at the approximate temperature of application of the tripotassium phosphate solution for approximately one-half hour to permit the exchange of potassium ions for sodium ions to be effected sufficiently to establish the desired compressive stress layer.

In the following examples tests were made on rods having an average diameter of 0.110 inch (chosen because this approximates the bottle sidewall thickness) and the composition of the glass tested was approximately as follows:

| | |
|---|---|
| $SiO_2$ | 71.5 |
| $Fe_2O_3$ | 0.042 |
| $Al_2O_3$ | 1.25 |
| CaO | 10.25 |
| MgO | 2.5 |
| BaO | 0.035 |
| $Na_2O$ | 13.5 |
| $K_2O$ | 0.023 |
| $SO_3$ | 0.26 |
| $TiO_2$ | 0.014 |

The foregoing is a conventional soda-lime-silica container glass composition and has a softening point of 1,327° F., an annealing point of 1,022° F. and a strain point of 986° F.

The rods were tested in groups of 25 to 30 rods each and the rods were broken under uniform conditions and the breaking strengths were tabulated.

A number of groups of rods were treated by heating the rods to 950° F., spraying a 50 percent solution of $K_3PO_4$ or $K_2HPO_4$ as will be explained below, and were then returned to the furnace and held at the 950° F. temperature for one-half hour, then cooled to room temperature for testing.

To serve as a basis of comparison, seven groups of 25 to 30 rods each of the above composition were annealed, being otherwise untreated. The lowest average strength of the rods of the untreated group was 14,200 p.s.i. and the highest 22,100 p.s.i. The average breaking strength of the several groups was slightly below 18,000 p.s.i.

Seventeen groups of 25 to 30 rods each were treated in the foregoing manner with aqueous solutions of $K_3PO_4$ and upon testing the group having the lowest average breaking strength averaged 39,000 p.s.i. and the group having the highest average breaking strength averaged 77,000 p.s.i. The overall average of the 17 groups of rods thus treated with $K_3PO_4$ and tested was 54,000 p.s.i.

Similar tests on like rods under the same condition performed on five groups of rods but employing dipotassium hydrogen phosphate ($K_2HPO_4$) produced the following average breaking strengths. The lowest average breaking strength of these five groups of 25 to 30 rods each was 24,000 p.s.i. and the highest was 43,000 p.s.i., the average of the five groups being 37,000 p.s.i.

From this it will be seen that the average breaking strengths of the foregoing tests are as follows:

Untreated rods—18,000 p.s.i.
Rods treated with $K_3PO_4$—54,000+ p.s.i.
Rods treated with $K_2HPO_4$—37,000 p.s.i.

From the foregoing it is clear that the average breaking strength of the rods treated with $K_3PO_4$ was three times that of the untreated rods and approximately 50 percent greater than that of the rods treated with $K_2HPO_4$.

The following test was made on nonreturnable beer bottles of the same composition as specified above. The bottles were sprayed with a 25 percent $K_3PO_4$ solution at between 500° and 600° F. and run through an annealing lehr. In the lehr sprayed bottles were raised to a temperature of approximately 1,000° F. and held at that temperature for about 5 minutes and then cooled in about 15 minutes. This produced a skin compression of about 3,000 p.s.i. approximately 30 microns deep.

The average hydrostatic bursting strength of untreated annealed bottles like those of the foregoing test and of the same glass composition is 435 p.s.i. and the average hydrostatic bursting strength of 20 bottles treated as specified in the preceding paragraph was 629 p.s.i.

While this strength increase ratio is substantially less than that experienced in the rod treatments detailed above, the conditions of spray application and the limited times for which the bottles were held at elevated temperature would account in part for lower increase in the strength of the glass.

Furthermore, in spraying the bottles in the foregoing bottle test, spray equipment and methods were of a rather crude nature so that uniform and complete spray application could not be expected. Also, these tests were made with a 25 percent $K_3PO_4$ solution and the temperature of application was about one-third lower than the temperature of application in the case of the above glass rod treatments. Another factor affecting the bottle test results is the complex geometry of glass bottles which produces unpredictable stress concentrations. All of these factors and others account for the lower strength increase in the case of the bottle tests although the noted increase in strength is still very substantial.

The strength of the tripotassium phosphate solution is variable through wide limits since solutions of lower strengths can be employed by spraying more solution on the glass. This is limited by practical considerations and also by the danger of thermal shock if too much water solution is sprayed on the glass. In the glass rod tests solutions of 50 percent $K_3PO_4$ were employed and in the above bottle tests 25 percent solutions were employed. This solution strength may be as low as 10 percent or 15 percent, in which case more solution would be sprayed on the bottle.

After the foregoing treatments the glass articles are washed with ordinary tap water to remove excess salt from the glass surface and leave the same clear and without haze. The salt thus washed from the surface may be reused within limits although reuse cannot be carried on after the sodium salt content of the reclaimed material becomes too high relative to the potassium salt content.

We claim:

1. A method of strengthening a soda-lime glass body by substituting potassium ions for sodium ions in a surface layer of the glass to produce a compressive surface layer, said method comprising spraying tripotassium phosphate ($K_3PO_4$) on the surface of the glass body with said surface at a temperature from about 500° F. to about the annealing point of the glass and maintaining the glass at a temperature from 500° F. to 1,050° F. for approximately 20 minutes, but in any case for a time insufficient to produce stress relaxation, to provide a substantial exchange of potassium ions for sodium ions to a depth sufficient to produce a substantial compressive surface layer, cooling the glass body, and removing the residual surface salt to produce a clear, strengthened glass body.

2. The method of claim 1 wherein the tripotassium phosphate is deposited against the heated glass body in water solution, the temperature of the glass bodies being sufficient to rapidly evaporate the solution.

3. The method of claim 2 wherein the water solution contains at least 10 percent of tripotassium phosphate.

4. The method of claim 1 wherein the glass body is maintained at a temperature between 500° F. and 1,050° F. for approximately 20 minutes or longer.

5. The method of claim 2 wherein the aqueous tripotassium phosphate solution is sprayed on a heated glass body immediately after formation thereof.

6. The method of claim 5 wherein the elevated temperature for ion exchange reaction is provided in the annealing treatment of the glass body.